United States Patent
Shim et al.

(10) Patent No.: US 6,643,528 B1
(45) Date of Patent: Nov. 4, 2003

(54) INTEGRATED RADIOTELEPHONE HOLSTER AND AUDIO APPLIANCE

(75) Inventors: Jae H. Shim, San Jose, CA (US);
Ilwhan Park, Pleasanton, CA (US);
Jeff R. Lind, Livermore, CA (US)

(73) Assignee: Mobigence, Inc., San Jose, CA (US)

( * ) Notice: Subject to any disclaimer, the term of this patent is extended or adjusted under 35 U.S.C. 154(b) by 340 days.

(21) Appl. No.: 09/657,946

(22) Filed: Sep. 8, 2000

(51) Int. Cl.⁷ .................................................. H04B 1/38
(52) U.S. Cl. ..................... 455/575.2; 455/348; 455/350
(58) Field of Search ................. 455/566, 568, 455/569, 575, 90, 550.1, 575.1, 575.2, 575.8, 351, 350, 348; 379/430, 433.01, 433.02, 433.03; 381/370, 381, 362, 454, 455

(56) References Cited

U.S. PATENT DOCUMENTS

| | | | | |
|---|---|---|---|---|
| 4,634,816 A | * | 1/1987 | O'Malley et al. | 379/430 |
| 5,191,602 A | * | 3/1993 | Regen et al. | 455/568 |
| 5,761,298 A | * | 6/1998 | Davis et al. | 379/430 |
| 5,956,399 A | * | 9/1999 | Whitley et al. | 379/446 |
| 6,078,825 A | * | 6/2000 | Hahn et al. | 455/569 |
| 6,081,695 A | * | 6/2000 | Wallace et al. | 455/90 |
| 6,125,513 A | * | 10/2000 | Cheraso et al. | 24/3.11 |
| 6,154,663 A | * | 11/2000 | Itamochi | 455/569 |
| 6,184,654 B1 | * | 2/2001 | Bachner et al. | 320/114 |
| 2001/0001765 A1 | * | 5/2001 | Chen | 455/569 |
| 2002/0016188 A1 | * | 2/2002 | Kashiwamura | 455/568 |

* cited by examiner

*Primary Examiner*—Nguyen T. Vo
*Assistant Examiner*—Tan Trinh
(74) *Attorney, Agent, or Firm*—John F. Schipper

(57) ABSTRACT

Integrated holster and audio appliance for a radiotelephone. The audio appliance includes a speaker and a microphone, spaced apart and connected by an extension that can be extended to position the speaker and the microphone near a user's ear and mouth and that can be folded or collapsed to fit into the holster with the radiotelephone. The radiotelephone need not be removed from the holster to receive and respond to calls. When the radiotelephone is positioned in the holster, electrical power for one or more selected radiotelephone components (display screen, touch sensitive screen, keypad, etc.) is optionally reduced or withdrawn to conserve battery charge, and a built-in speaker and a built-in microphone for the radiotelephone are optionally disabled. The system includes an optional retraction mechanism to retract an electrical cable associated with use of the audio appliance into the holster when the audio appliance is not in use.

24 Claims, 8 Drawing Sheets

INTEGRATED RADIOTELEPHONE HOLSTER AND AUDIO APPLIANCE

FIELD OF THE INVENTION

This invention relates to a collapsible audio appliance, including a speaker and microphone, integrated with a holster for a portable, handheld radiotelephone, and for operation of the holstered radiotelephone in a power saving mode.

BACKGROUND OF THE INVENTION

A holster is often used to attach a handheld electronic communications device, such as a portable, handheld radiotelephone to an article of clothing, such as a belt or shoulder strap. As used herein a "holster" includes a receptacle, constructed from plastic, leather, fabric, metal, other appropriate material and combination of such materials and carried on the person of, or by, a device user, that receives and holds a communications device (referred to collectively as a "radiotelephone" herein) when the device is not being used to transmit and receive information. Use of a holster can prevent or minimize the likelihood of accidental or unintentional disengagement of the radiotelephone from the user.

When a radiotelephone is mounted in or received by a holster, an audio appliance, including a speaker or other earpiece accessory ("speaker") and a microphone, is provided as a separate unit and is connected to the radiotelephone to receive voice signals without removing the radiotelephone from the holster. However, plugs or jacks for an audio appliance are often mounted on a surface (top, side, bottom) of the radiotelephone housing, and it is often cumbersome for a radiotelephone user to connect the audio appliance while the radiotelephone is still held by the holster. A conventional electrical extension cable is often provided, with no mechanism to retract the cable onto the holster when the audio appliance is not in use. As a result, the audio appliance is often allowed to dangle from the user or from the holster, when the audio appliance is not in use. Because the audio appliance is treated as a separate unit from the holster, the audio appliance cannot be conveniently stored in, and retrieved from, the holster. The audio appliance often does not provide an adequate extension from speaker to microphone so that the microphone is located inconveniently relative to the user's mouth.

What is needed is an audio appliance that is integrated into the holster so that this appliance can be easily stored in, and retrieved from, the holster. Preferably, the audio appliance should provide an adjustable extension that mechanically (and, optionally, electrically) connects the speaker and the microphone and that permits the microphone to be placed at any convenient location relative to the user's mouth. Preferably, the integrated system should provide a retraction mechanism for a cable associated with this appliance. Preferably, receipt of the radiotelephone into the holster should permit the radiotelephone to enter an electrical energy saving mode, in order to extend the life of the present charge of a battery used to power the radiotelephone, and should allow the radiotelephone to be easily activated and deactivated without removing the radiotelephone from the holster.

SUMMARY OF THE INVENTION

These needs are met by the invention, which provides a holster, integrated with a collapsible or foldable audio appliance, having a speaker that may be located near a user's ear and having a microphone that may be placed at a location in close proximity to the user's mouth. The audio appliance can be collapsed or folded and placed in the holster for convenient storage therein. A cable retraction mechanism built into the holster allows the audio appliance to be extracted from, and retracted into, the holster.

The radiotelephone, when it is received into the holster, optionally enters a (partial) sleep mode in which a display screen (LCD or other), a backlight, a keypad, a touch sensitive screen, a sensor and/or a visual alert LED indicator may be turned off to conserve electrical charge for the power source. This sleep mode is activated when one or more electrical or mechanical terminals on the radiotelephone contact one or more selected electrical or mechanical terminals on the holster. When the radiotelephone is removed from the holster, this sleep mode is optionally deactivated so that all necessary features of the radiotelephone are ready for use in transmitting and receiving voice as well as data signals. One or more buttons is located on the holster, where the buttons are exposed and can be easily reached by the user. These buttons are used to activate and/or deactivate the voice-receiving and voice-transmitting functions of the radiotelephone when the audio appliance is extracted for use while the radiotelephone is in the holster. Optionally, the built-in speaker and/or built-in microphone are disabled when the radiotelephone is received into the holster, or when the audio appliance is extracted for use while the radiotelephone is kept in the holster.

DESCRIPTION OF BEST MODES OF THE INVENTION

Figures 1A, 1B:
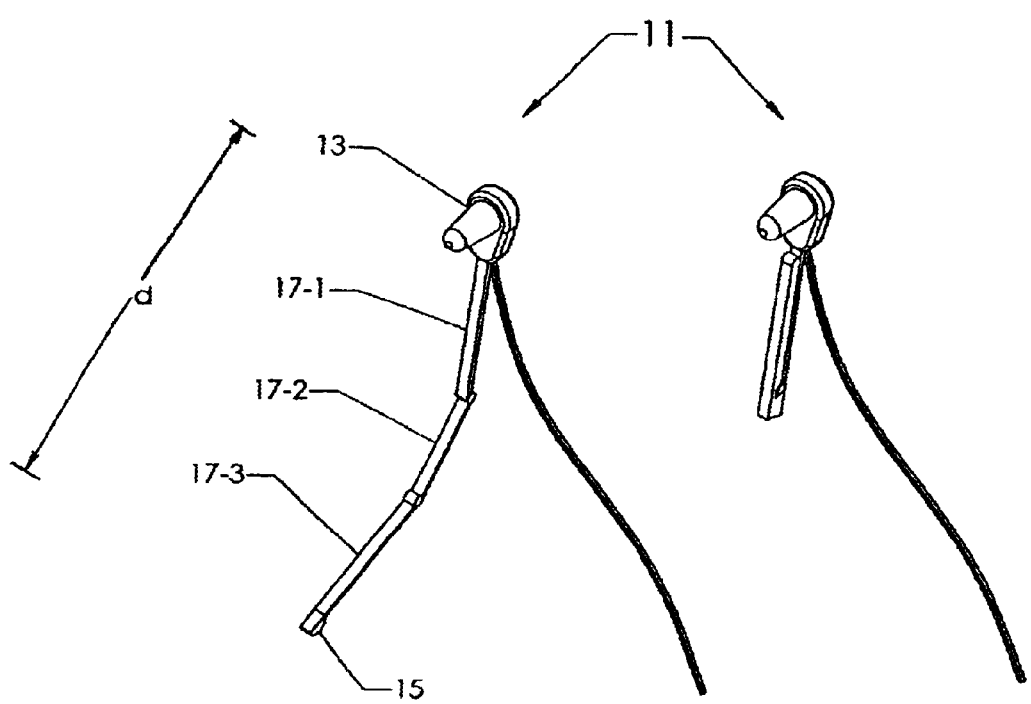
FIGS. 1A and 1B are perspective views illustrating an audio appliance in an unfolded state and in a folded state, respectively, according to an embodiment of the invention.

FIG. 1A illustrates the appearance of an audio appliance 11 of the invention in one embodiment, in an unfolded or non-collapsed state. The audio appliance 11 includes a speaker or other audio signal receiving appliance 13 that is optionally located near a user's ear, a microphone or other audio signal transmitting appliance 15, and a collapsible or foldable extension 17 that provides electrical and mechanical connections between the speaker 13 and the microphone 15. The foldable extension 17 includes two, three, four or more firm or rigid extension segments, 17-i (i=1, 2, 3, . . . , that are connected end-to-end by joints or hinges that can be folded or collapsed into a storage mode and that can be fixed and maintained in a particular mechanical configuration in an operating mode. When the foldable extension 17 is fully extended, the speaker 13 and microphone 15 are spaced apart by a selected distance d that ranges from about 8 cm to about 20 cm, or higher if desired. The extension segments 17-i are optionally arranged or unfolded relative to each other so that, when the speaker 13 is located near a radiotelephone user's ear, the microphone 15 is located adjacent to the user's mouth.

FIG. 1B illustrates the appearance of an audio appliance 11 of the invention in one embodiment, in a folded or collapsed state, in which two or more of the extension segments 17-i are located beside and approximately parallel to each other to provide an audio appliance with reduced length; in this reduced length state, the audio appliance 11 is optionally received into a pocket or other receptacle on the holster (not shown) for storage.

Figure 2:
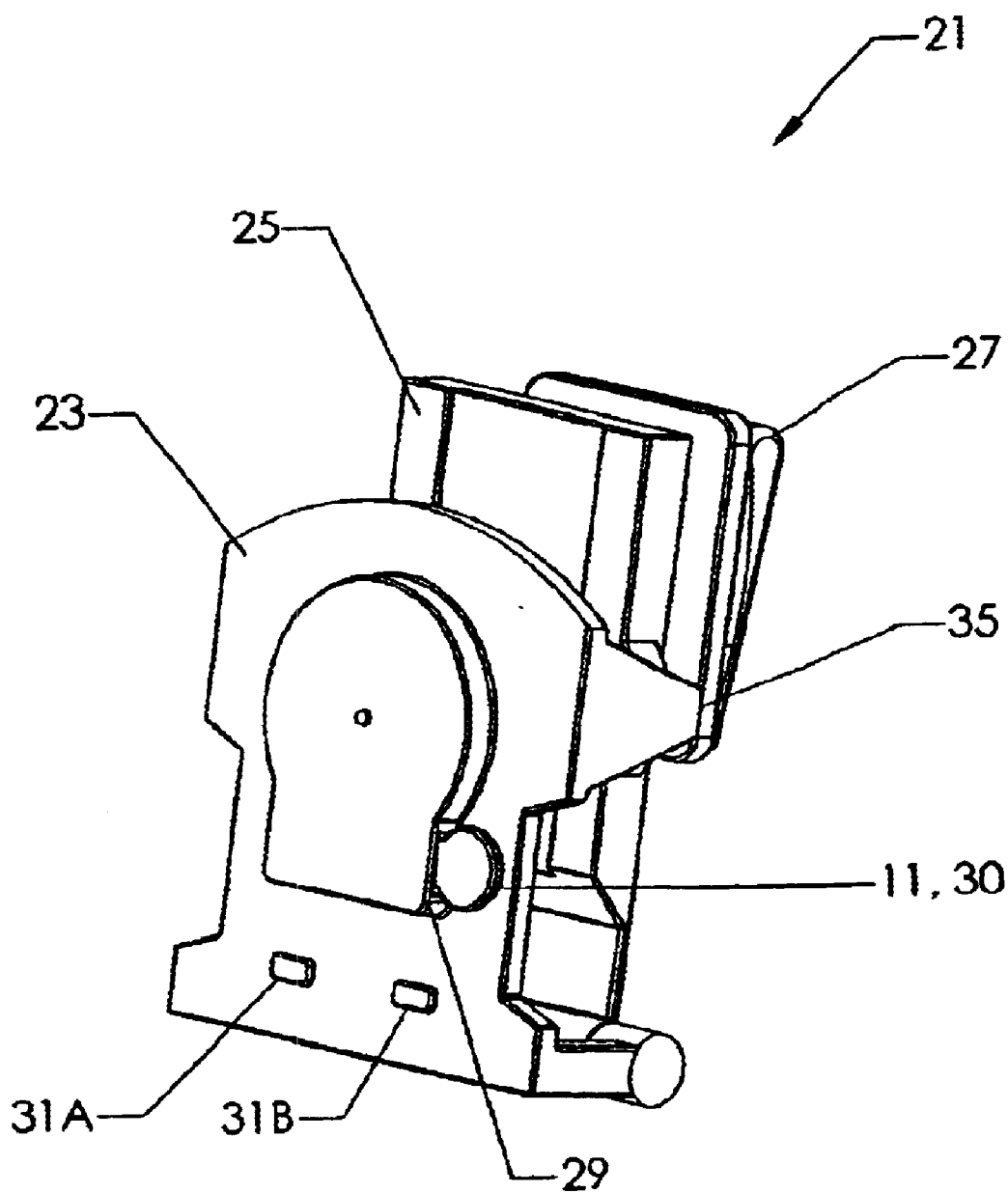
FIGS. 2 and 3 are perspective view illustrating a front side and a rear side, respectively, of one embodiment of the holster.
Figure 3:
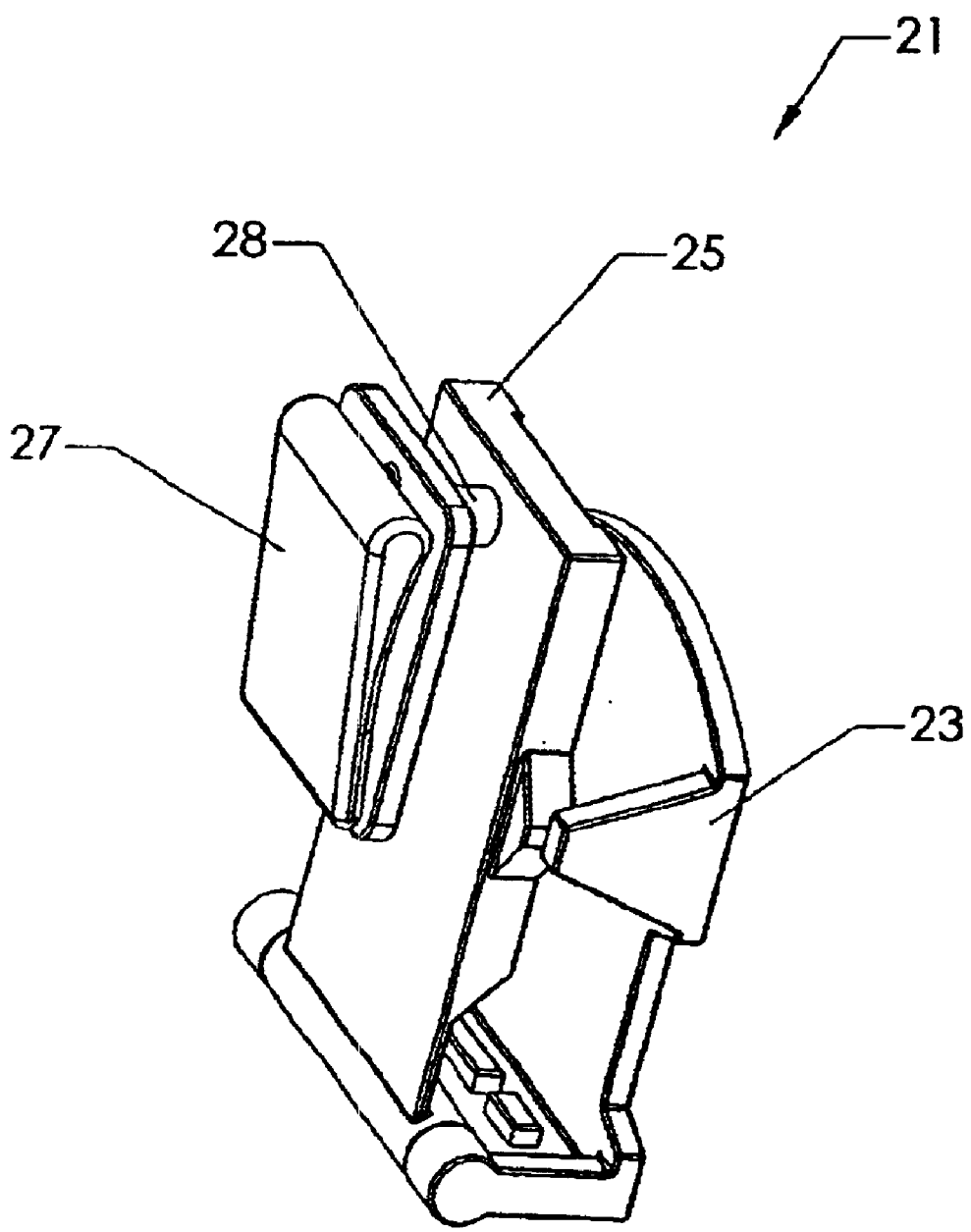

FIGS. 2 and 3 illustrate a front view and a rear view, respectively, of an embodiment of the holster 21 according to the invention. The holster 21 includes a cover deck 23, a main deck 25, a belt or shoulder strap clip 27 and a clip swivel rod 28. The collapsible or foldable extension 17, when collapsed or folded, and the other components of the audio appliance 11 are preferably stored in the cover deck 23 and are inserted through a slot or aperture 29, preferably located at a lower side of the cover deck. Alternatively, a cable retraction mechanism 30, such as a spring-driven cable wind-up mechanism, can be provided to retract a cable that electrically connects the audio appliance 11 to the holster 21, when the audio appliance is not in use. The audio appliance 11, in a folded or collapsed state, may instead be stored in the main deck in an analogous manner.

The cover deck 23 also includes one or more buttons, 31A and 31B, that are exposed and easily reached when a radiotelephone (not shown) is received into the holster 21; the button(s) 31A and 31B, may be placed at any convenient location on the cover deck 23, or on the main deck 25. The button(s), 31A and 31B, on the holster 21 provide a mechanical connection and/or an electrical connection to the activation/deactivation button(s) or knob(s) on the radiotelephone. A single button, 31A or 31B, that allows toggling between an activated state (e.g., receive incoming call) and a deactivated state (e.g., terminate call) can serve this purpose. One or more buttons, 31A or 31B, is pressed to activate, or to deactivate, the receive-signal function (for voice or data), the transmit-voice function, a phone mail function or other desired function of the radiotelephone when this device is already received into the holster 21, without removing the radiotelephone from the holster.

The main deck 25 optionally includes a spring locking and releasing device 35 that secures the cover deck 23 for secure attachment of the radiotelephone in the holster 21. The belt/shoulder strap clip 27 is preferably attached to the rear of the main deck 25 but may be attached at some other convenient place, depending upon where the holster 21 is to be carried on the user's body. The cover deck 23 and main deck 25 are preferably hinged into open and closed positions for more convenient receipt and release of the radiotelephone from the holster 21.

Figure 4:
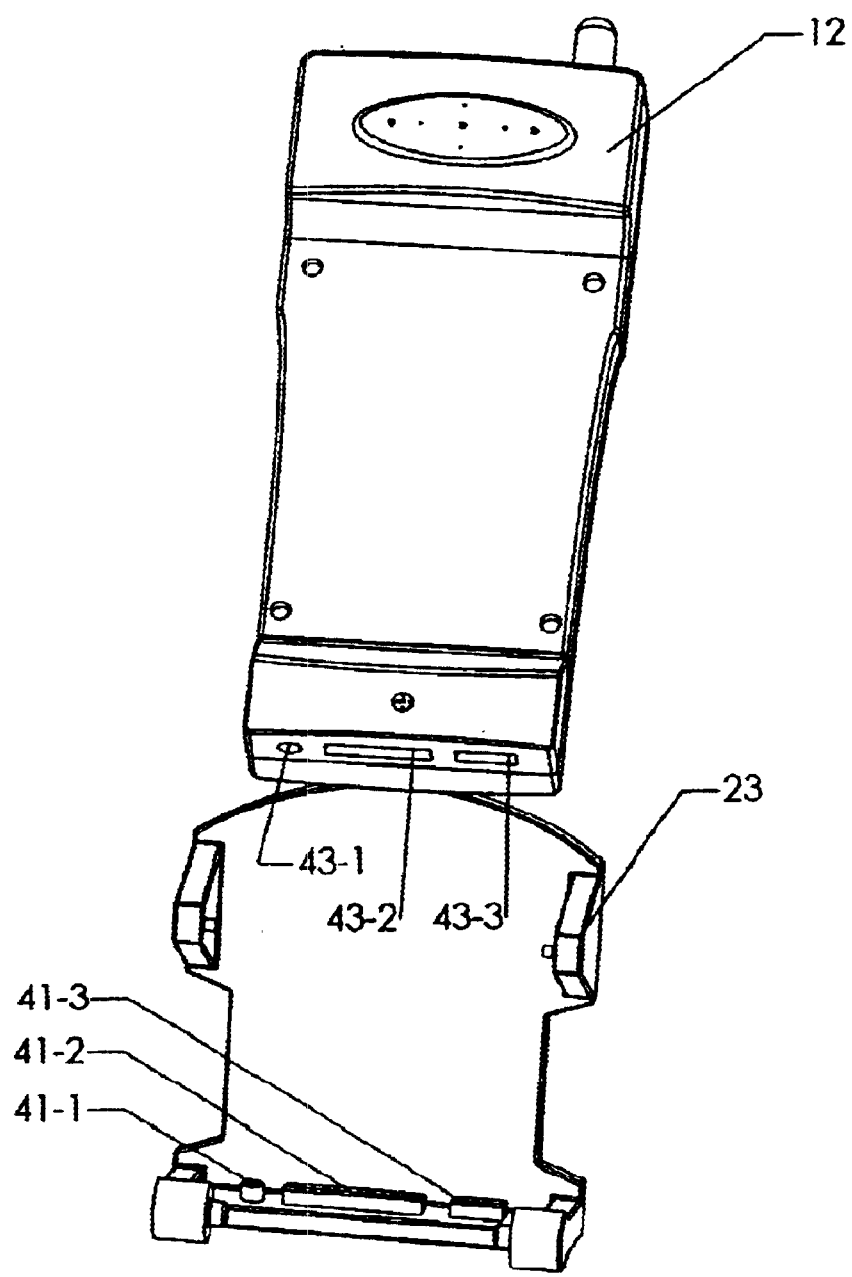
FIG. 4 is a perspective view illustrating terminals built into a holster and built into a radiotelephone in one embodiment.

FIG. 4 illustrates one or more electrical and/or mechanical terminals, 41-1, 41-2 and 41-3, provided in the cover deck 23 (FIG. 2) and the corresponding one or more electrical and/or mechanical terminals, 43-1, 43-2 and 43-3, provided in a radiotelephone 12. When the radiotelephone 12 is received into the holster 21, the terminal 41-i and the corresponding terminal 43-i (i=1, 2, 3) make electrical and/or mechanical contact to provide pass-through of selected electrical signals from the cover deck 23 to the radiotelephone 12.

Optionally, when the radiotelephone 12 is received into the holster 21, the terminal 41-i, or when the audio appliance is extracted for use and the radiotelephone is kept in the holster, and the corresponding terminal 43-i (i=1, 2, 3) make electrical and/or mechanical contact, the built-in speaker and/or built-in microphone (not shown) for the radiotelephone are disabled, to avoid providing two sets of (possibly confusing) voice signals for the radiotelephone to process, and is optionally re-enabled when the radiotelephone is removed from the holster.

Optionally, when the radiotelephone 12 is received into the holster 21, the terminal 41-i and the corresponding terminal 43-i (i=1, 2, 3) make electrical and/or mechanical contact, the radiotelephone is optionally caused to move into an electrical power conserving mode or sleep mode, by taking the following deactivation actions for one or more of the following selected components of the radiotelephone: blanking one or more display screens (LCD or other), turning off one or more display backlights, disabling one or more touch sensitive screens, disabling one or more keypads, turning off one or more keypad backlights, disabling one or more sensors associated with operation of the radiotelephone, and turning off one or more light emitting diode ("LED") indicators for visual alerts. This action reduces the charge drain on a battery or battery pack that provides electrical power for the radiotelephone 12. These deactivated components are usually not needed or used when the radiotelephone 12 is received into the holster 21, even where the holstered radiotelephone is used to receive and respond to an incoming telephone call. Alternatively, the sleep mode can be overridden or bypassed so that these components remain activated for use.

Figure 5:
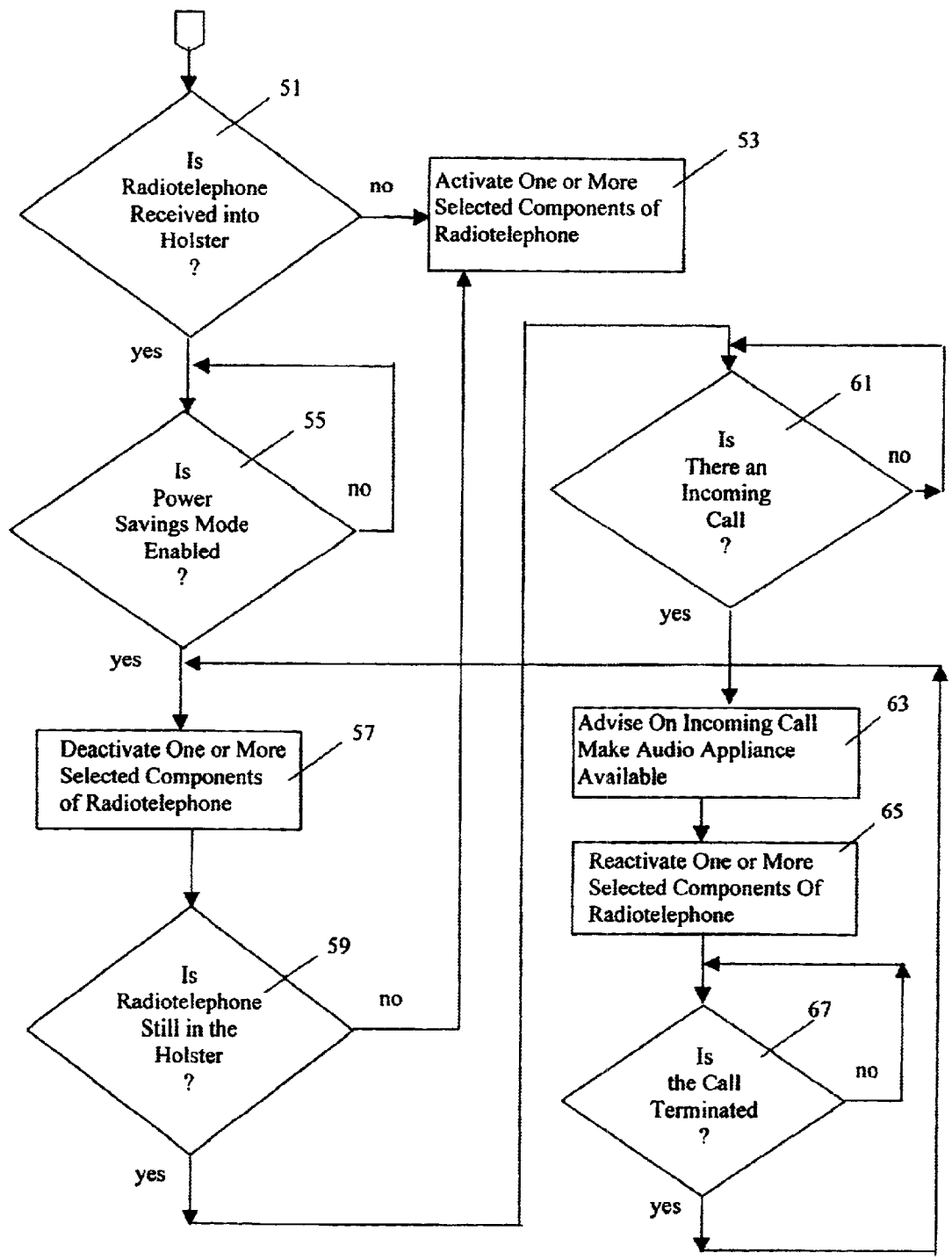
FIG. 5 is a flow chart illustrating a procedure for practicing an embodiment of the invention.

FIG. 5 is a flow chart of a procedure that may be used to practice power-conserving feature(s) of the invention. In step 51, the system determines if a radiotelephone device is received into a selected holster. If the answer to the query in step 51 is "no," the system moves to step 53 and optionally activates one or more selected components of the radiotelephone (display(s), touch sensitive screen (s), keypad(s), backlight(s), radiotelephone operation sensors, visual alert LED indicators), as discussed in the preceding. If the answer to the query in step 51 is "yes," the system determines if a power-conserving mode of the radiotelephone is to be bypassed or overridden, in step 55. If the answer to the query in step 55 is "no," the system returns to step 55.

If the answer to the query in step 55 is "yes," the system moves to step 57 and deactivates one or more selected components of the radiotelephone (display(s), touch sensitive screens, keypad(s), backlight(s), radiotelephone operation sensors, visual alert LED indicators). The system then moves to step 59 and determines if the radiotelephone is still in the holster. If the answer to the query in step 59 is "no," the system moves to step 53 and activates one or more of the selected components.

If the answer to the query in step 59 is "yes," the system moves to step 61 and determines if an incoming radiotelephone signal for this radiotelephone device is being received. If the answer to the query in step 61 is "no," the system returns to step 61. If the answer to the query in step 61 is "yes," the system optionally advises the user (wearing the holster) of the incoming call and makes an audio appliance available for use in responding to the telephone call, in step 63. The system optionally reactivates one or more of the selected components (display(s), touch sensitive screen(s), keypad(s), backlight(s), radiotelephone operation sensors, visual alert LED indicators), if these are presently deactivated, in step 65. In most situations, the user need not remove the radiotelephone from the holster to respond to an incoming call, unless some portion of the display screen and/or the touch sensitive screen and/or the keypad for the radiotelephone is needed for the response. The system then moves to step 67 (optional) and determines if the radiotelephone call has been terminated. If the answer to the query in step 67 is "no," the system returns to step 67. If the answer to the query in step 67 is "yes," the system returns to step 57.

Figures 6A, 6B:
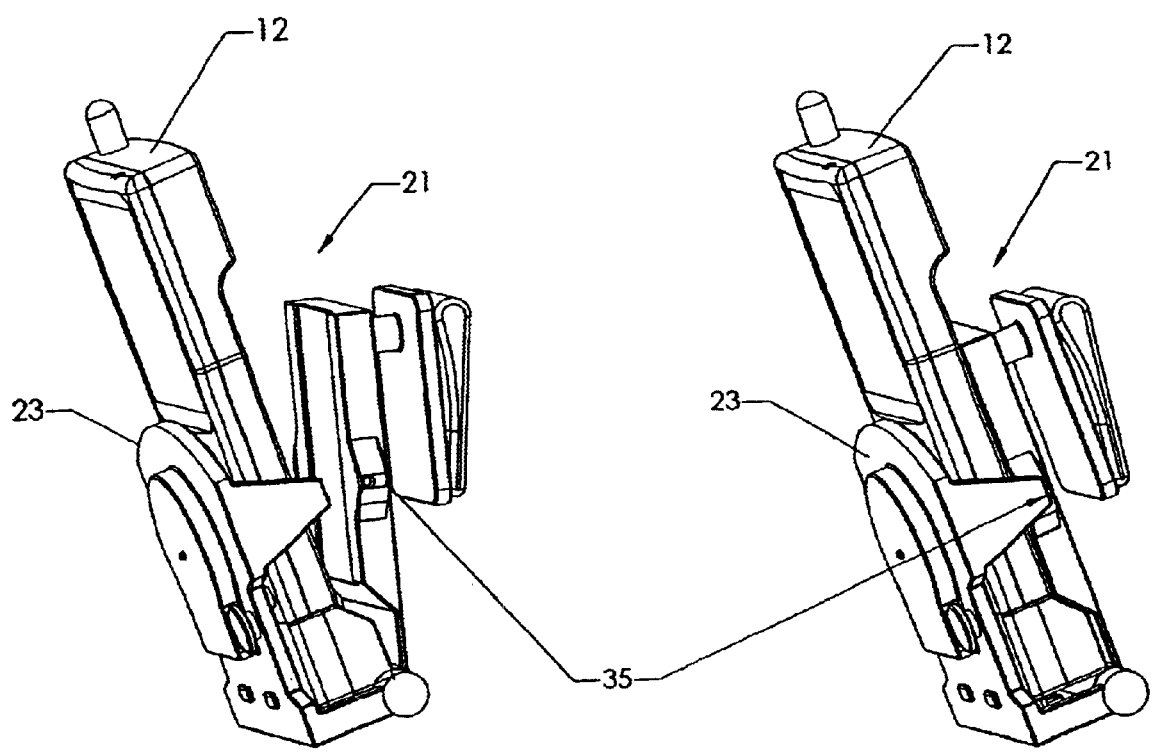
FIGS. 6A and 6B are perspective views of a radiotelephone received into a holster in an open position and in a secured position, respectively.

FIGS. 6A and 6B illustrate the appearance of the holster 21 in an open position and in a closed position, respectively. With the holster 21 in an open position (FIG. 6A), the radiotelephone 12 is placed on the cover deck 23 and electrical connections are established between the holster and the radiotelephone. With the holster 21 in a closed position surrounding the radiotelephone 12, the spring lock 35 is firmly in place and the radiotelephone is substantially immobilized relative to the holster.

Figures 7A, 7B:
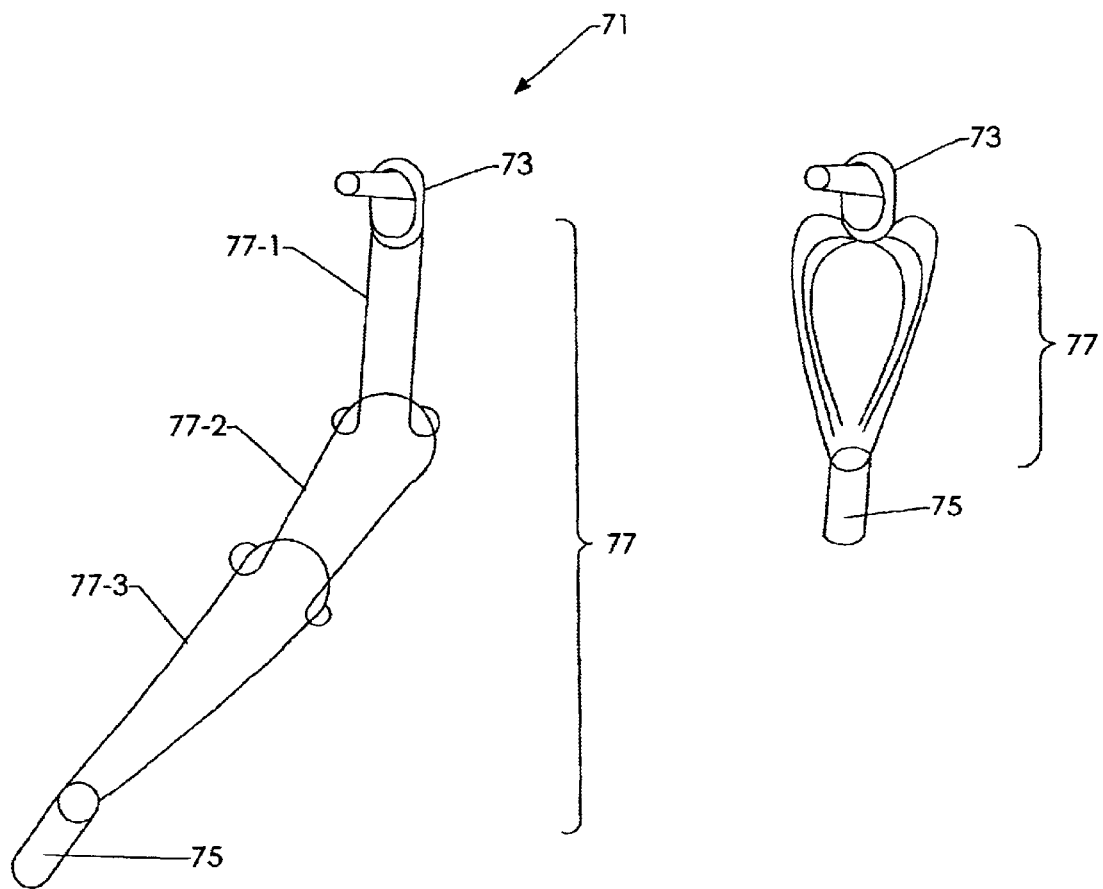
FIGS. 7A and 7B are perspective views illustrating an audio appliance in an extended state and in a collapsed state, respectively, according to an alternative embodiment of the invention.

FIGS. 7A and 7B illustrate an alternative embodiment 71 for the audio appliance, in an extended configuration and in a collapsed configuration, respectively. As in the audio appliance embodiment illustrated in FIGS. 1A and 1B, the audio appliance 71 includes a speaker 73 and a microphone 75, spaced apart from each other by a selected distance d. The audio appliance 71 further includes an extension 77, including two or more curved, interlocking extension segments, 77-i (i=1, 2, 3, ... ) that can slide past one another and become established in an extended position (FIG. 7A) or become established in a collapsed position (FIG. 7B) that can be conveniently stored in a relatively small portion of a radiotelephone holster (not shown). Two adjacent extension segments, 77-i and 77-(i+1) surround and interlock with each other and are capable of sliding past each other in a non-interlocked position. This embodiment allows the extension 77 to be extended an arbitrary amount, consistent with the maximum length of the uncollapsed extension, so that, with the location of the speaker 73 fixed adjacent to a user's ear, the microphone 75 may be positioned arbitrarily close to the user's mouth.

Figure 8:
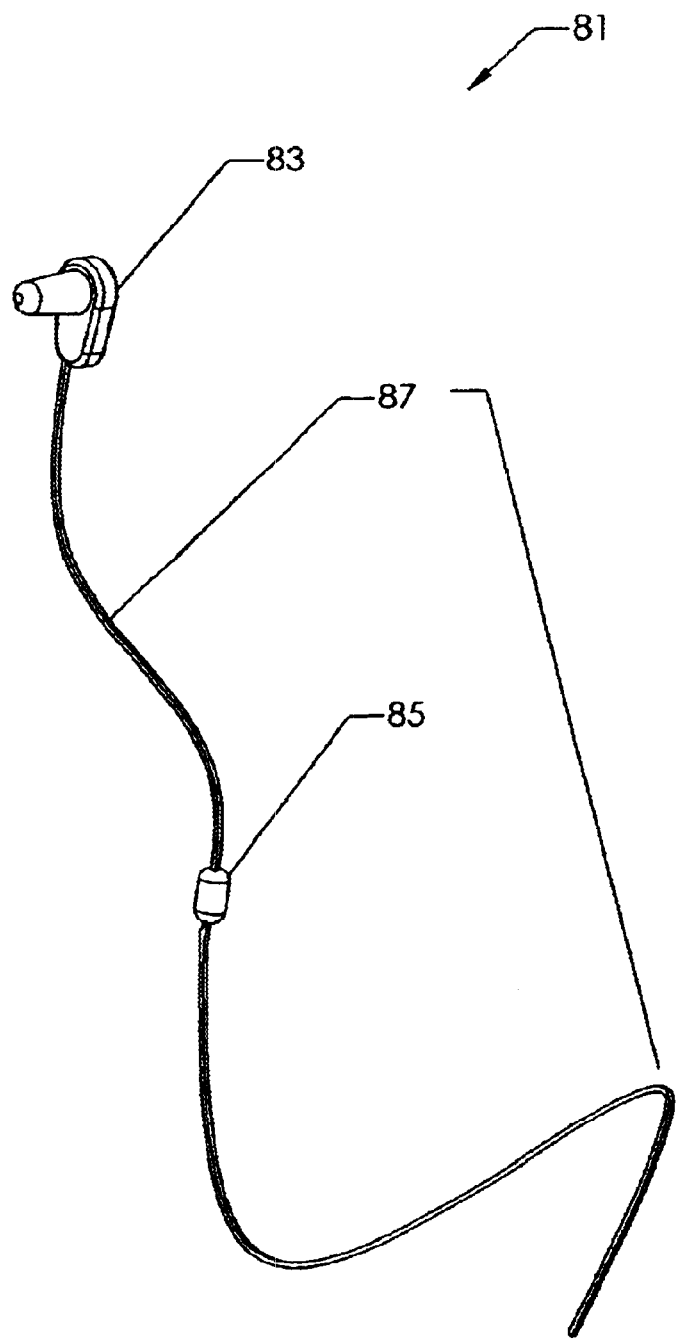
FIG. 8 is a perspective view of a conventional audio appliance that provides an extension of a distance from speaker to microphone, using a flexible, single length extension phone cable.

FIG. 8 illustrates the appearance of a conventional radiotelephone earpiece 81. In this instance, the connection between a speaker 83 and a microphone 85 is made through a flexible or limp extension phone cable 87. The cable can be made arbitrarily long so that the microphone 85 and speaker 83 can be spaced apart by an arbitrary distance. However, the flexible cable 87 cannot be reconfigured into an arbitrary shape that will be firmly held so that, with the speaker 83 located adjacent to a user's ear, it is not possible to firmly place the microphone 85 at an arbitrary location, such as adjacent to the user's mouth, from which location the microphone will not move. The extension cable is very flexible and will not hold a chosen shape, unsupported, in three dimensions. Many conventional earpieces 81 do not provide a mechanism for retraction of the cable 87 when the earpiece is not in active use.

What is claimed is:

1. Apparatus for carrying and controlling operation of a handheld radiotelephone, the apparatus comprising:
    an audio appliance, which is electrically connectable to a handheld radiotelephone having an electrical power source, and which comprises:
        a speaker for providing audio signals received by the radiotelephone;
        a microphone for receiving audio signals that are to be transmitted elsewhere by the radiotelephone; and
        a collapsible extension, having an extended state and a collapsed state, which provides a mechanical connection, having at least one of controllable length and controllable shape, between the speaker and the microphone and that provides an electrical connection between the audio appliance and the handheld radiotelephone; and
    a holster for receiving, holding and releasing the radiotelephone, and for receiving, holding and releasing the audio appliance in the collapsed state,
    wherein each of the holster and the radiotelephone includes an electrical terminal that is configured so that, when the radiotelephone is received by the holster, the holster terminal and the radiotelephone terminal contact each other and cause electrical power to be reduced or withdrawn for at least one of a display screen, a display screen backlight, a touch sensitive screen, a keypad, a keypad backlight, a sensor associated with operation of the radiotelephone and an LED indicator for a visual alert associated with the radiotelephone.

2. The apparatus of claim 1, wherein, when said radiotelephone is released from said holster, said holster terminal and said radiotelephone terminal no longer contact each other and electrical power is provided or increased for at least one of said display screen, said display screen backlight, said touch sensitive screen, said keypad, said keypad backlight, said sensor associated with operation of said radiotelephone and said LED indicator for said visual alert associated with said radiotelephone.

3. A method of carrying and controlling operation of a handheld radiotelephone, the method comprising:
    providing an audio appliance, which is electrically connectable to a handheld radiotelephone having an electrical power source, and which comprises:
        a speaker for providing audio signals received by the radiotelephone;
        a microphone for receiving audio signals that are to be transmitted elsewhere by the radiotelephone; and
        a collapsible extension, having an extended state and a collapsed state, which provides a mechanical connection, having at least one of controllable length and controllable shape, between the speaker and the microphone and that provides an electrical connection between the audio appliance and the handheld radiotelephone;
    providing a holster to receive, hold and release the radiotelephone, and to receive, hold and release the audio appliance in the collapsed state; and
    providing each of the holster and the radiotelephone with an electrical terminal that is configured so that, when the radiotelephone is received by the holster, the holster terminal and the radiotelephone terminal contact each other and cause electrical power to be reduced or withdrawn for at least one of a display screen, a display screen backlight, a touch sensitive screen, a keypad, a keypad backlight, a sensor associated with operation of the radiotelephone and an LED indicator for a visual alert associated with the radiotelephone.

4. The method of claim 3, further comprising providing or increasing electrical power for at least one of said display screen, said display screen backlight, said touch sensitive screen, said keypad, said keypad backlight, said sensor associated with operation of said radiotelephone and said LED indicator for said visual alert associated with said radiotelephone, when said radiotelephone is released from said holster and said holster terminal and said radiotelephone terminal no longer contact each other.

5. Apparatus for carrying and controlling operation of a handheld radiotelephone, the apparatus comprising:
  an audio appliance, which is electrically connectable to a handheld radiotelephone having an electrical power source, and which comprises:
    a speaker for providing audio signals received by the radiotelephone;
    a microphone for receiving audio signals that are to be transmitted elsewhere by the radiotelephone; and
    a collapsible extension, having an extended state and a collapsed state, which provides a mechanical connection, having at least one of controllable length and controllable shape, between the speaker and the microphone and that provides an electrical connection between the audio appliance and the handheld radiotelephone; and
  a holster for receiving, holding and releasing the radiotelephone, and for receiving, holding and releasing the audio appliance in the collapsed state,
  wherein the collapsible extension includes an electrical signal-carrying cable that is connected to the holster at a cable end, and the holster comprises a cable retraction mechanism that receives the cable end and controllably retracts an arbitrary length of the received cable into the holster without use of a radiotelephone user's hands.

6. The apparatus of claim 5, wherein said collapsible extension comprises a sequence of N mechanically firm segments (N>1), each having a first end and a second end and being numbered j=1, ..., N, where the second end of segment number j and the first end of segment number j+1 (j=1, ..., N−1) are connected by a joint that has a loosened state and a tightened state, and when this joint is in a loosened state the first end of segment number j and the second end of segment number j+1 can be moved toward each other or away from each other.

7. The apparatus of claim 6, wherein, when said collapsible extension is in said extended state, said speaker can be positioned adjacent to an ear of a user of said radiotelephone and said microphone can be positioned adjacent to an ear of the user.

8. The apparatus of claim 5, wherein said collapsible extension includes an electrical signal-carrying cable that is connected to said holster at a cable end, and said holster comprises a cable retraction mechanism that receives the cable end and controllably retracts the received cable into said holster.

9. The apparatus of claim 5, wherein said radiotelephone comprises a built-in speaker and a built-in microphone, and each of said radiotelephone and said holster comprises an electrical terminal that is configured so that, when said radiotelephone is received by said holster, the holster terminal and the radiotelephone terminal contact each other and disable at least one of the built-in speaker and the built-in microphone.

10. The apparatus of claims 9, wherein, when said radiotelephone is released from said holster, said holster terminal and said radiotelephone terminal no longer contact each other and at least one of said built-in speaker and said built-in microphone is no longer disabled.

11. The apparatus of claim 5, wherein said radiotelephone comprises a built-in speaker and a built-in microphone, and each of said radiotelephone and said holster comprises an electrical terminal that is configured so that, when said radiotelephone is received by said holster and said audio appliance is activated, the holster terminal and the radiotelephone terminal contact each other and at least one of the built-in speaker and the built-in microphone is disabled.

12. The apparatus of claim 11, wherein, when said radiotelephone is released from said holster, said holster terminal and said radiotelephone terminal no longer contact each other and at least one of said built-in speaker and said built-in microphone is no longer disabled.

13. The apparatus of claim 11, wherein at most one of said audio appliance speaker and said built-in speaker is activated at any time.

14. The apparatus of claim 11, wherein at most one of said audio appliance microphone and said built-in microphone is activated at any time.

15. The apparatus of claim 5, wherein said holster comprises a clip that attaches to a belt or other article of clothing and that receives, holds and releases at least one of said radiotelephone and said audio appliance.

16. A method of carrying and controlling operation of a handheld radiotelephone, the method comprising:
  providing an audio appliance, which is electrically connectable to a handheld radiotelephone having an electrical power source, and which comprises:
    a speaker for providing audio signals received by the radiotelephone;
    a microphone for receiving audio signals that are to be transmitted elsewhere by the radiotelephone; and
    a collapsible extension, having an extended state and a collapsed state, which provides a mechanical connection, having at least one of controllable length and controllable shape, between the speaker and the microphone and that provides an electrical connection between the audio appliance and the handheld radiotelephone;
  providing a holster to receive, hold and release the radiotelephone, and to receive, hold and release the audio appliance in the collapsed state; and
  providing the collapsible extension with an electrical signal-carrying cable that is connected to the holster at a cable end, and providing the holster with a cable retraction mechanism that receives the cable end and controllably retracts the received cable into the holster without use of a radiotelephone user's hands.

17. The method of claim 16, further comprising choosing said collapsible extension to comprise a sequence of N mechanically firm segments (N>1), each having a first end and a second end and being numbered j=1, ..., N, where the second end of segment number j and the first end of segment number j+1 (j=1, ..., N−1) are connected by a joint that has a loosened state and a tightened state, and when this joint is in a loosened state the first end of segment number j and the second end of segment number j+1 can be moved toward each other or away from each other.

18. The method of claim 17, further comprising positioning said speaker adjacent to an ear of a user of said radiotelephone and positioning said microphone adjacent to an ear of the user when said collapsible extension is in said extended state.

19. The method of claim 16, further comprising providing said collapsible extension with an electrical signal-carrying cable that is connected to said holster at a cable end, and providing said holster with a cable retraction mechanism that receives the cable end and controllably retracts the received cable into said holster.

20. The method of claim 16, further comprising providing said radiotelephone with a built-in speaker and a built-in microphone, and providing each of said radiotelephone and said holster with an electrical terminal that is configured so that, when said radiotelephone is received by said holster, the holster terminal and the radiotelephone terminal contact each other and disable at least one of the built-in speaker and the built-in microphone.

21. The method of claim 20, further comprising enabling at least one of said built-in speaker and said built-in microphone, when said radiotelephone is released from said holster and said holster terminal and said radiotelephone terminal no longer contact each other.

22. The method of claim 16, further comprising providing said radiotelephone with a built-in speaker and a built-in microphone, and providing each of said radiotelephone and said holster with an electrical terminal that is configured so that, when said radiotelephone is received by said holster and said audio appliance is activated, the holster terminal and the radiotelephone terminal contact each other and at least one of the built-in speaker and the built-in microphone is disabled.

23. The method of claim 22, further comprising enabling at least one of said built-in speaker and said built-in microphone, when said radiotelephone is released from said holster and said holster terminal and said radiotelephone terminal no longer contact each other.

24. The method of claim 16, further comprising providing, as part of said holster, a clip that attaches to a belt or other article of clothing and that receives, holds and releases at least one of said radiotelephone and said audio appliance.

\* \* \* \* \*